(12) United States Patent
Kinemura

(10) Patent No.: US 8,181,121 B2
(45) Date of Patent: May 15, 2012

(54) DISPLAY UNIT AND DISPLAY METHOD

(75) Inventor: Hiroyuki Kinemura, Hyogo (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 935 days.

(21) Appl. No.: 11/910,170

(22) PCT Filed: Mar. 30, 2006

(86) PCT No.: PCT/JP2006/307298
§ 371 (c)(1),
(2), (4) Date: Sep. 28, 2007

(87) PCT Pub. No.: WO2006/104269
PCT Pub. Date: Oct. 5, 2006

(65) Prior Publication Data
US 2009/0135203 A1    May 28, 2009

(30) Foreign Application Priority Data
Mar. 31, 2005  (JP) .................................. 2005-103315

(51) Int. Cl.
*G06F 3/048* (2006.01)
*H04N 5/222* (2006.01)

(52) U.S. Cl. ................ 715/838; 348/333.05; 348/333.11

(58) Field of Classification Search .......... 345/473–475, 345/660–671; 715/835–838; 348/207.1–376
See application file for complete search history.

(56) References Cited

U.S. PATENT DOCUMENTS

| | | | | |
|---|---|---|---|---|
| 6,734,909 B1* | 5/2004 | Terane et al. | ............ | 348/333.05 |
| 7,657,846 B2* | 2/2010 | Banks et al. | ................... | 715/836 |
| 2001/0008416 A1 | 7/2001 | Misawa et al. | | |
| 2002/0012522 A1* | 1/2002 | Kawakami et al. | ............. | 386/52 |
| 2003/0090528 A1* | 5/2003 | Masuda et al. | ................ | 345/838 |
| 2004/0095375 A1* | 5/2004 | Burmester et al. | ............ | 345/716 |
| 2005/0120307 A1* | 6/2005 | Suzuki | ......................... | 715/765 |
| 2005/0251758 A1* | 11/2005 | Cummins et al. | ............. | 715/838 |
| 2006/0156254 A1 | 7/2006 | Satake | | |

(Continued)

FOREIGN PATENT DOCUMENTS

CN    1283038 A    2/2001

(Continued)

OTHER PUBLICATIONS

Chinese Office Action dated Mar. 6, 2009, issued in corresponding Chinese Patent Application No. 2006800099487.

(Continued)

*Primary Examiner* — Daniel Washburn
*Assistant Examiner* — Donna Ricks
(74) *Attorney, Agent, or Firm* — Westerman, Hattori, Daniels & Adrian, LLP

(57) ABSTRACT

When displaying on a display (46) a plurality of thumbnails respectively corresponding to a plurality of image files selected from an external memory card (40), the CPU 26 determines whether each image file is a moving image file or a still image file, and creates an enlarged thumbnails by clipping the center of the thumbnail corresponding to the moving image file and enlarging it by an electronic zoom processing circuit (37). Then, a first screen including the plurality of thumbnails and a second screen including the enlarged thumbnail in place of the thumbnail corresponding to the moving image file on the first screen are alternately displayed.

10 Claims, 8 Drawing Sheets

U.S. PATENT DOCUMENTS

2010/0050125 A1* 2/2010 Nobori .......................... 715/838

FOREIGN PATENT DOCUMENTS

| | | | |
|---|---|---|---|
| JP | 2000-138883 | A | 5/2000 |
| JP | 2001-45407 | A | 2/2001 |
| JP | 2001-197447 | A | 7/2001 |
| JP | 2006-186647 | A | 7/2006 |

OTHER PUBLICATIONS

International Search Report of PCT/JP2006/307298, date of mailing Jul. 25, 2006.

Japanese Office Action dated Oct. 27, 2009, issued in corresponding Japanese Patent Application No. 2005-103315.

* cited by examiner (A)

(B)

(A)

(B)

(A)

(B)

(C)

DISPLAY UNIT AND DISPLAY METHOD

TECHNICAL FIELD

The present invention relates to a display unit. Specifically, the present invention relates to a display unit capable of displaying reduced images of a still image and a moving image.

PRIOR ART

Recently, in digital cameras, mobile phones with camera, and etc., the kind of files they can handle is increasing. Specifically, there are a number of appliances capable of recording still images and moving images.

In a case that thumbnails of still image files and moving image files which are recorded are displayed on a display, specifically, in a case that the still image files and the moving image files are mixed, unless the thumbnails of the still image files and the thumbnails of the moving image files are displayed so as to be discriminate one from the other, the user cannot discriminate between the still image file and moving image file out of the plurality of thumbnails.

One example of an image handling apparatus capable of displaying a plurality of thumbnails mixed with still image files and moving image files is disclosed in Japanese Patent Application Laid-Open No. 2000-138883. In the related art, when the plurality of thumbnails mixed with the still images and the moving images are displayed, thumbnails of moving images are applied with a mark or an icon so as to be discriminated from the thumbnails of the still images.

However, in the related art, marks and the icons applied to the thumbnail images of the moving images are so small that the user may miss the marks or the icons. Furthermore, if the thumbnails of the moving images are complicated, the mark and the icon may be mistaken as a part of the thumbnails and may be missed.

SUMMARY OF THE INVENTION

Therefore, it is a primary object of the present invention to provide a novel display unit and display method.

Another object of the present invention is to provide a display unit and a display method capable of displaying a plurality of reduced images each corresponding to a plurality of original images with the kind of each of the original images evident.

A display unit according to an invention of claim 1 is a display unit capable of displaying a plurality of reduced images respectively corresponding to a plurality of original images, and comprises an identifying means (S1) for identifying each kind of the plurality of original images, a processing means (S15) for performing predetermined processing on a first reduced image (102A) corresponding to an original image whose identification result by the identifying means indicates a specific kind, and thereby generating a second reduced image (102B), and a display (S23, S27, S29 and S33) for alternately displaying a first screen (110A) including the first reduced image and a second screen (110B) including the second reduced image in place of the first reduced image on the first screen.

In the invention according to claim 1, each kind of the plurality of original images is identified by an identifying means. A processing means performs predetermined processing on a first reduced image corresponding to an original image whose identification result indicates a specific kind, and thereby generating a second reduced image. The display displays a first screen including the first reduced image and a second screen including the second reduced image in place of the first reduced image on the first screen. Accordingly, the first reduced image within the display screen is periodically switched to the second reduced image.

According to the invention in claim 1, when the plurality of reduced images respectively corresponding to the plurality of original images are displayed, only the first reduced image corresponding to the original image of the specific kind is periodically changed to a second reduced image, that is, only the first reduced image is periodically changed in display magnification, and therefore, it is possible to easily identify whether or not each of the plurality of original images is a specific kind or other kind. Furthermore, since the second reduced image is generated from the first reduced image, there is no need of preparing the second reduced image in advance, contributing to make the memory capacity for storing the reduced image less.

A display unit according to an invention of claim 2 is dependent on claim 1, and the first screen further includes a third reduced image (100A) corresponding to an original image whose identification result by the identifying means indicates a kind except for the specific kind, and the second screen further includes a fourth reduced image (100B) the same as the third reduced image.

In the invention according to claim 2, the periodically changing reduced image and the non-changing reduced images are included in the same screen, capable of making an easy identification.

A display unit according to an invention of claim 3 is dependent on claim 1, and the predetermined processing is processing of clipping a part of the first reduced image and enlarging it.

According to the invention in claim 3, it is possible to make the change between the first reduced image and the second reduced image clear and less uncomfortable.

A display unit according to an invention of claim 4 is dependent on claim 3, and each of the plurality of original images is any one of a still image and a moving image, and the first reduced image corresponds to a moving image, and the third reduced image corresponds to a still image.

According to the invention in claim 4, the reduced image corresponding to the moving image periodically changes in display magnification, but the reduced image corresponding to the still image is not changed, thus making it possible to intuitively identify both of the images.

In a display method, a program and a program recording medium according to claims 5, 9 and 10, respectively, similarly to claim 1, it is possible to easily determine whether or not each of the plurality of original images is a specific kind (typically, moving image) or other kind (typically, still image).

According to the present invention, it is possible to display the plurality of reduced images respectively corresponding to the plurality of original images with the kind of each of the original image evident.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
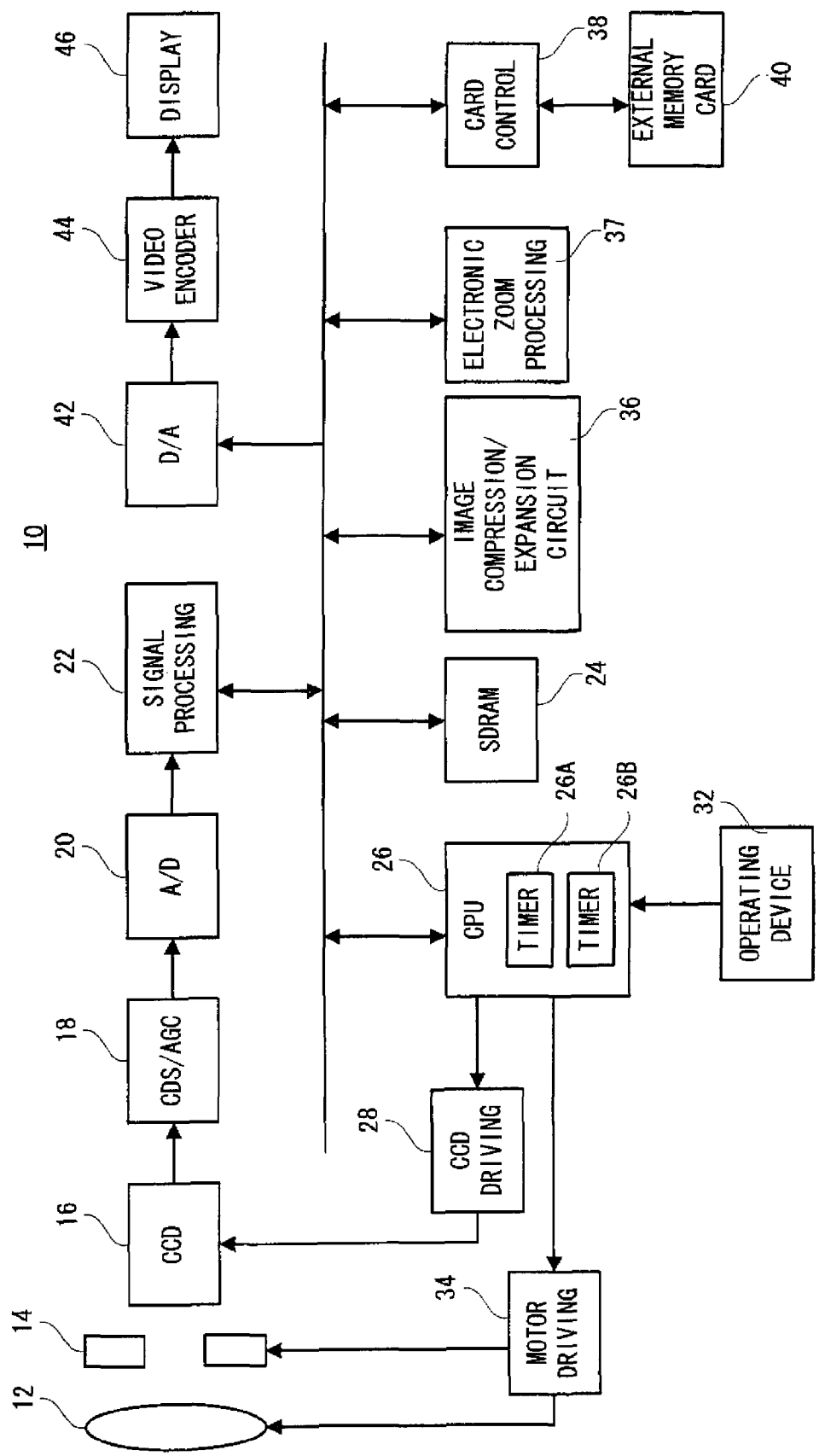
FIG. 1 is a block diagram showing one embodiment of the present invention.

In this embodiment, a description is made on the form of an imaging device 10 as one example of a display unit. The block diagram of the imaging device 10 in this embodiment is shown in FIG. 1. The imaging device 10 in this embodiment is provided with an imaging lens 12, an aperture 14, a CCD imager 16, a CDS (Correlated Double Sampling)/AGC (Auto Gain Contorol) circuit 18, an A/D converter 20, a signal processing circuit 22, an SDRAM 24, a CPU 26, a CCD driving circuit 28, an operating device 32, a motor driving circuit 34, an image compression/expansion processing circuit 36, an electronic zoom processing circuit 37, a card control circuit 38, an external memory card 40, a D/A converter 42, a video encoder 44, and a display 46.

The imaging lens 12 forms an image on the imaging surface of the CCD imager 16 being an imaging device. Furthermore, the imaging lens 12 can be moved in an optical axis direction to allow the distance with the imaging surface of the CCD imager 16 to be adjusted on the basis of an output signal from the CCD imager 16. The aperture 14 adjusts light amounts from the imaging lens 12 to the CCD imager 16 by being controlled by the CPU 26. The adjustment of these imaging lens 12 and aperture 14 are made by the motor driving circuit 34. It should be noted that the motor driving circuit 34 is constructed by two motors not shown for individually adjusting the imaging lens 12 and the aperture 14.

When an optical image of an object is focused on the imaging surface of the CCD imager 16 by the imaging lens 12, photoelectronic conversion is performed in each of photodiodes making up of the CCD imager 16. Thus, in the CCD imager 16, electric charges corresponding to the intensity of the lights and the exposure time are accumulated. The CCD imager 16 is supplied with various pulses from the CCD driving circuit 28, and the CCD imager 16 outputs a signal representing the accumulated electric charges, that is, an analog imaging signal in response to the supplied pulses.

The CDS/AGC circuit 18 reduces noise of the analog imaging signal output from the CCD imager 16, and automatically adjusts the level of the analog imaging signal.

The A/D converter 20 converts the analog imaging signal output from the CDS/AGC circuit 18 into digital image data.

The signal processing circuit 22 performs color separation on the converted digital moving image data to create three color signals, that is, an R signal, a G signal and a B signal. Then, a temperature detection and a color temperature control based on the detection result are made on each of the created three color signals to thereby adjust a gain in each of the three color signals. Next, the these three color signals are converted into a luminance signal, that is, Y signal and two color-difference signals, that is, a U signal and a V signal.

The CPU 26 is provided with a timer 26A and a timer 26B, and connected with a signal processing circuit 22, an SDRAM 24, a CCD driving circuit 28, an operating device 32, a motor driving circuit 34, an image compression/expansion processing circuit 36 and a card control circuit 38. The CPU 26 performs a control of the signal processing circuit 22, the SDRAM 24, the CCD driving circuit 28, the motor driving circuit 34, the image compression/expansion processing circuit 36, an electronic zoom processing circuit 37 and the card control circuit 38 according to the programs stored in an internal memory not shown.

Figure 2:
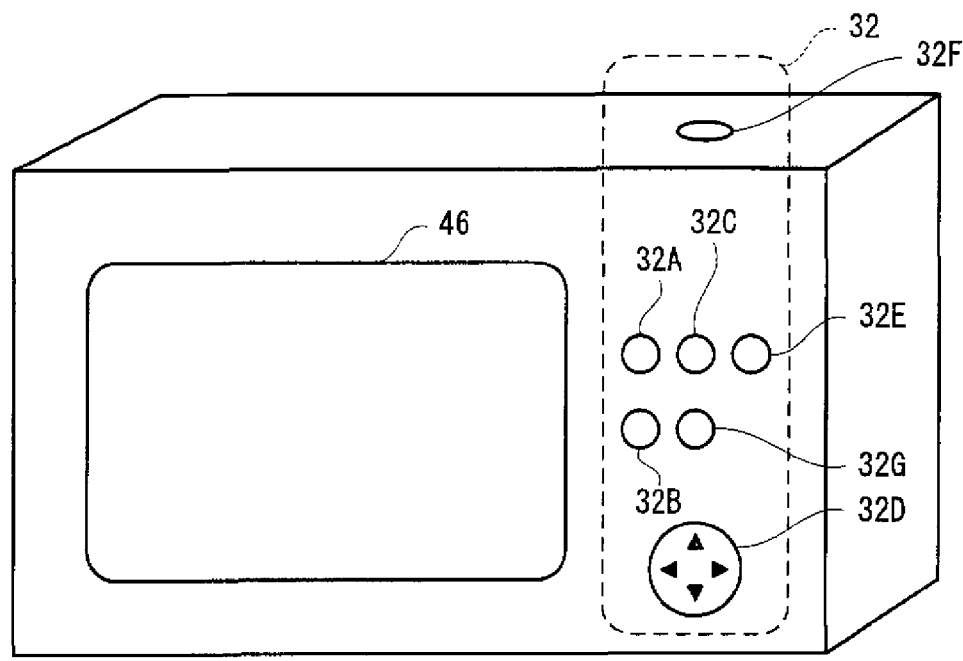
FIG. 2 is an illustrative view showing an appearance of FIG. 1 embodiment.

As shown in FIG. 2, in this embodiment, the operating device 32, a still image imaging mode key 32A, a moving image imaging mode key 32B, a reproduction mode key 32C, a cursor key 32D, a determination key 32E, a release key 32F and a thumbnail display key 32G are provided. As to the imaging device 10, by the user operating the release key 32F, a release operation is performed, and by the user operating the still image imaging mode key 32A, the moving image imaging mode key 32B, the reproduction mode key 32C and the thumbnail display key 32G, a mode switching can be performed between a still image imaging mode, a moving image imaging mode, a reproduction mode, and a thumbnail display mode. Furthermore, by operating the cursor key 32D, a desired item can be selected with a cursor from a selection item displayed on the display 46, and by depressing the determination key 32E, various setting can be made. Furthermore, when the cursor key 32D is operated in the thumbnail display mode, a current thumbnail display screen is renewed by a next thumbnail display screen.

In a state of the still image imaging mode in accordance with an operation of the still image imaging mode key 32A, when the release key 32F is pushed to perform a still image imaging operation, the CPU 26 issues a still image imaging instruction. In response thereto, one frame of an optical image of the object is captured by the CCD imager 16 through the imaging lens 12 and the aperture 14. The analog imaging signal corresponding to the captured optical image is subjected to the above-described processing by the CDS/AGC circuit 18, the A/D converter 20 and the signal processing circuit 22 so as to be converted into a Y signal, a U signal and a V signal (YUV signal) being a digital imaging signal. The converted YUV signal is temporarily stored in the SDRAM 24.

Then, one frame of the digital image data temporarily stored is compressed in the JPEG by the image compression/signal processing circuit 36. Also, the image compression/signal processing circuit 36 is constituted of a JPEG codec for still image, a Motion JPEG codec for moving image, etc. The compressed digital image data compressed is stored in the SDRAM 24 again.

The CPU 26 creates thumbnail data from one frame of the digital image data temporarily stored. The created thumbnail data is stored in the SDRAM 24, compressed in the JPEG by the image compression/expansion processing circuit 36, and the compressed thumbnail data compressed is stored in the SDRAM 24 again.

Then, the CPU 26 records the compressed digital image data and the compressed thumbnail data in the external memory card 40 as one still image file by controlling the card control circuit 38.

In a moving image imaging mode in accordance with an operation of the moving image imaging mode key 32B, when the release key 32F is pushed to execute a moving imaging operation, moving image processing is executed. The moving image processing is continued until the release key 32F is pushed again to end the moving image imaging. The moving image processing is processing similar to the processing of continuously executing still image imaging processing of 30 frames during one second, and can be continued until the digital image data of the YUV signal is temporarily stored in the SDRAM 24 by the moving image imaging time period.

Then, the CPU 26 performs luminance value detection with respect to the continuous plurality of frames of digital image data for each frame in time sequence when ending operation of the moving image imaging is made. That is, the high frequency component of the luminance signal Y is detected, the detection result is integrated during one frame of period, and the integrated result is recorded in the SDRAM 24 as a luminance value in time sequence. Furthermore, the continuous plurality of frames digital image data stored in the SDRAM 24 is compressed in MotionJPEG by the image compression/expansion processing circuit 36, and stored in the SDRAM 24 again.

Then, the CPU 26 compares the luminance values of the plurality of frames of digital image data recorded in the SDRAM 24 at two frames being successive in time sequence, determines the two successive frames with greater change, detects digital image data of the latter frame out of the relevant successive two frames, and generates thumbnail data from the detected digital image data. The generated thumbnail data is stored in the SDRAM 24, and is compressed in JPEG by the image compression/signal processing circuit 36. The compressed thumbnail data compressed is stored in the SDRAM 24 again.

When the moving image includes a scene change, by such a processing, the end frame of the previous scene and the top frame of the latter scene are detected to thereby select the latter one as a thumbnail.

For example, in a case that the object the user starts to image in the moving image imaging is an object with less complexity such as white wall, etc., and the imaging object is changed to an object with more complexity such as a person, etc. than the white wall, etc. during imaging, it is possible to generate the thumbnail of the person in place of the thumbnail of the white wall.

Then, the CPU 26 records the continuous plurality of frames of the compressed image data and the compressed thumbnail data as one moving image file in the external memory card 40 by controlling the card control circuit 38. It should be noted that the moving image file is different from the still image file in extension, etc. so as to be identified.

When the reproduction mode key 32C is operated, the CPU 26 reproduces the still image file and the moving image file recorded in the external memory card 40 to thereby display the obtained moving image and still image on the display 46. Specifically, in a case that the still image file is reproduced, the CPU 26 temporarily stores in the SDRAM 24 the compressed image data of the still image file recorded in the external memory card 40 by controlling the card control circuit 38. The compressed image data stored in the SDRAM 24 is expanded by the image compression/expansion processing circuit 36. The expanded digital image data is temporarily stored in the SDRAM 24, and converted into an analog image signal by the D/A converter 42. The video encoder 44 converts the analog image data from the D/A converter 42 into an NTSC signal, and displays the converted NTSC signal on the display 46.

In a case that the moving image file is reproduced, the CPU 26 reads the plurality of frames of the compressed image data from the moving image file recorded in the external memory card 40 by controlling the card control circuit 38, and temporarily stores the read compressed image data in the SDRAM 24. The plurality of frames of the compressed image data stored in the SDRAM 24 is expanded by the image compression/expansion processing circuit 36. The expanded plurality of frames of the digital image data is temporarily stored in the SDRAM 24, and converted into an analog image signal in time sequence by the D/A converter 42. The video encoder 44 converts the analog image data from the D/A converter 42 into an NTSC signal, and displays the converted NTSC signal on the display 46 in order.

Figure 3:
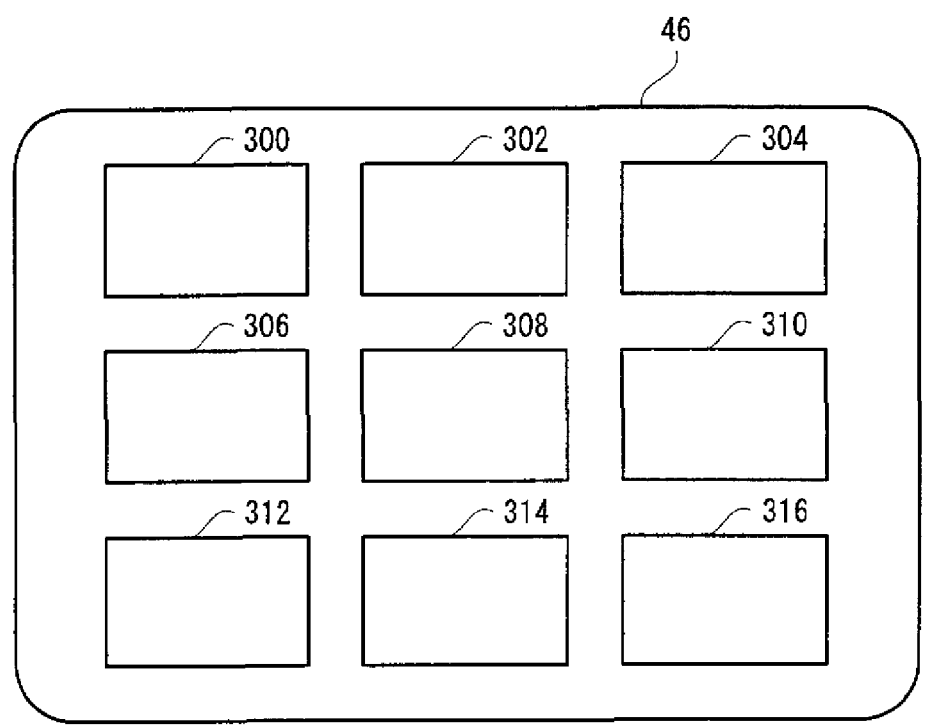
FIG. 3 is an illustrative view showing one example of a thumbnail display screen applied to FIG. 1 embodiment.

When the thumbnail display key 32G is operated, the CPU 26 displays a thumbnail display screen based on the still image file and the moving image file recorded in the external memory card 40 in a manner shown in FIG. 3, for example. The thumbnail display screen in FIG. 3 includes nine thumbnails 300-316. The image data corresponding to the thumbnail display screen is stored in a buffer 200 shown in FIG. 8 being a part of the SDRAM 24, and converted into an analog image signal by the D/A converter 42. The video encoder 44 converts the analog image data from the D/A converter 42 into an NTSC signal, and displays the converted NTSC signal on the display 46.

Furthermore, in accordance with an instruction from the CPU 26, the electronic zoom processing circuit 37 performs an enlargement processing on the digital image data and the thumbnail data stored in the SDRAM 26, and stores the processed digital image data and thumbnail data in the SDRAM 24 again.

Figure 4:
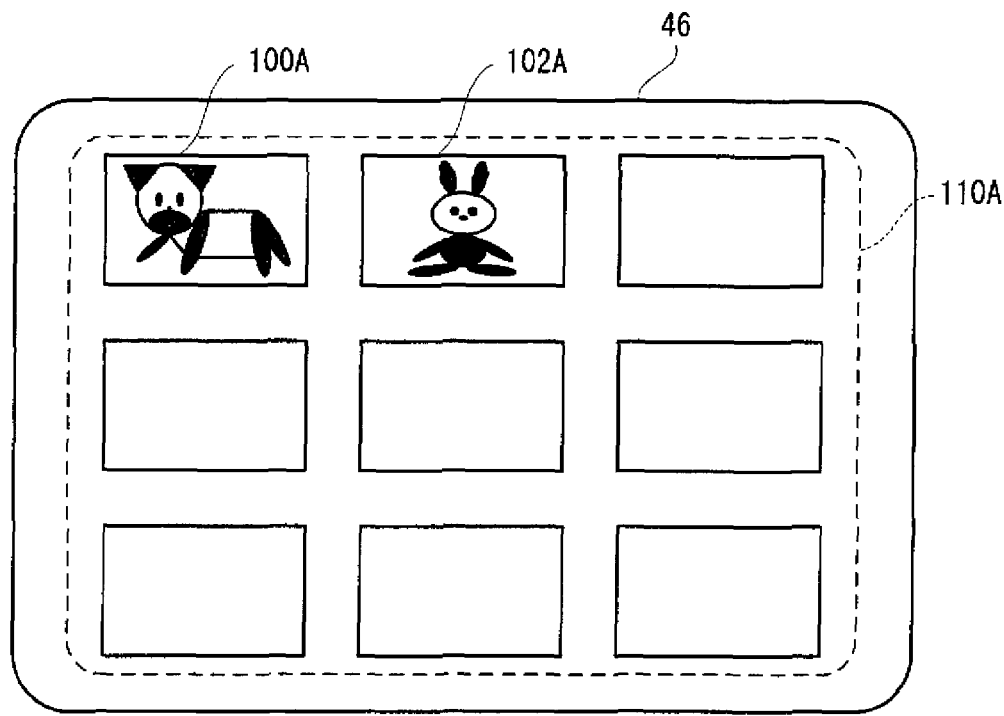
FIG. 4(A) is an illustrative view showing another example of a thumbnail display screen applied to FIG. 1 embodiment.
FIG. 4(B) is an illustrative view showing the other example of a thumbnail display screen applied to FIG. 1 embodiment.
Figure 4:
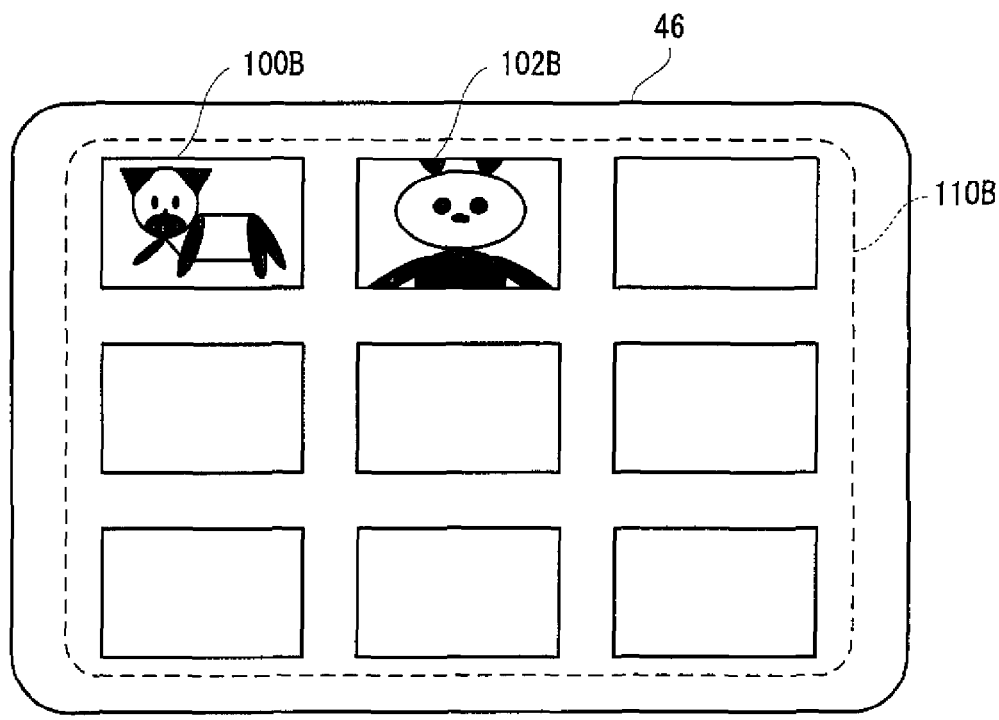
Figure 5:
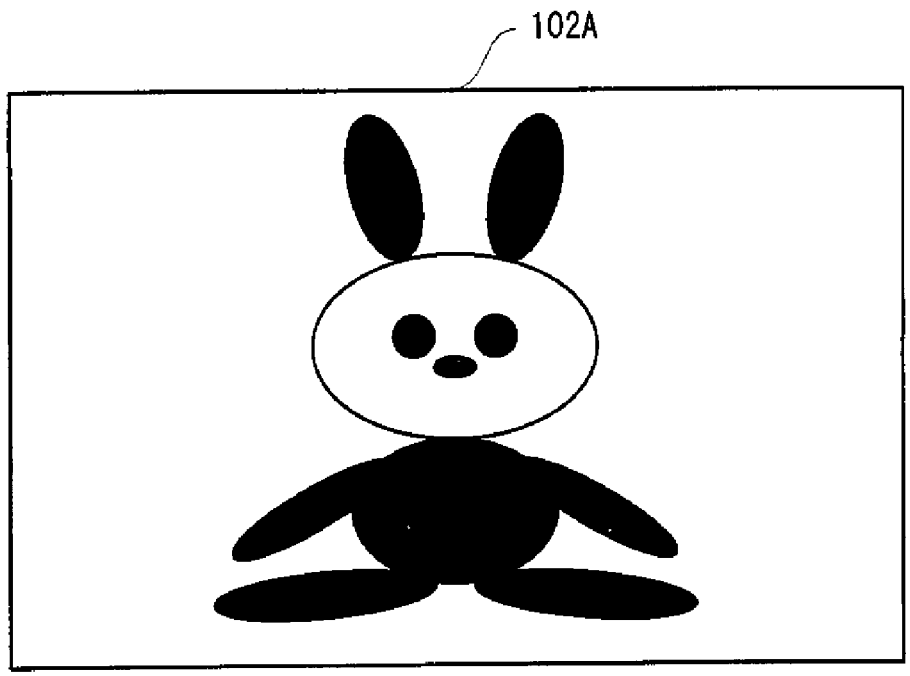
FIG. 5(A) is an illustrative view showing a part of the thumbnail display screen in FIG. 4(A)
FIG. 5(B) is an illustrative view showing a part of the thumbnail display screen in FIG. 4(B)
Figure 5:
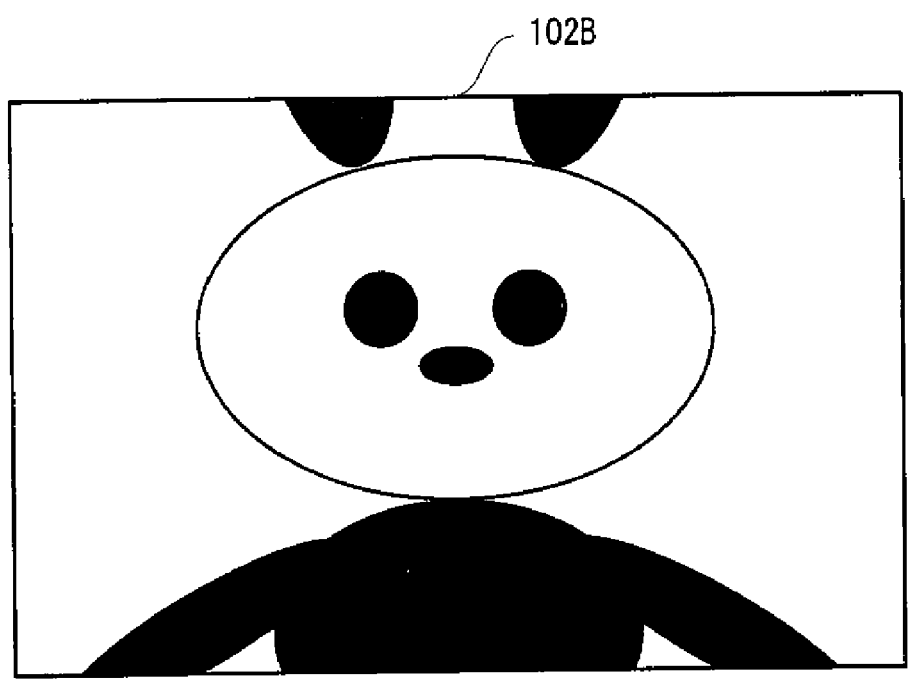

Each of FIG. 4(A) and FIG. 4(B) shows nine thumbnail display screens mixed with still image files and moving image files on the display 46. The thumbnail display screen 110A shown in FIG. 4(A) includes a thumbnail 100A of a still image file and a thumbnail 102A of a moving image file. A thumbnail display screen 110B shown in FIG. 4(B) is a thumbnail display screen displayed on the display 46 in place of the thumbnail display screen 110A after 0.5 seconds from the display of the thumbnail display screen 110A, and includes a thumbnail 100B of a still image file and a thumbnail 102B of a moving image file. As shown in FIG. 5(A) and FIG. 5(B), the thumbnail 102B is a thumbnail obtained by enlarging the center of the thumbnails 102A by the electronic zoom processing circuit 37, that is, an enlarged thumbnail of the thumbnail 102A.

Then, the thumbnail display screen 110A shown in FIG. 4(A) is displayed on the display 46 again after 0.5 seconds from displaying the thumbnail display screen 110B. That is, the thumbnail display screen 110A and the thumbnail display screen 110B are alternately displayed on the display 46 every 0.5 seconds. Such displaying operation is continued until other operations are performed, such as until the operation of pushing the still image imaging mode key 32A is made.

Figure 8:
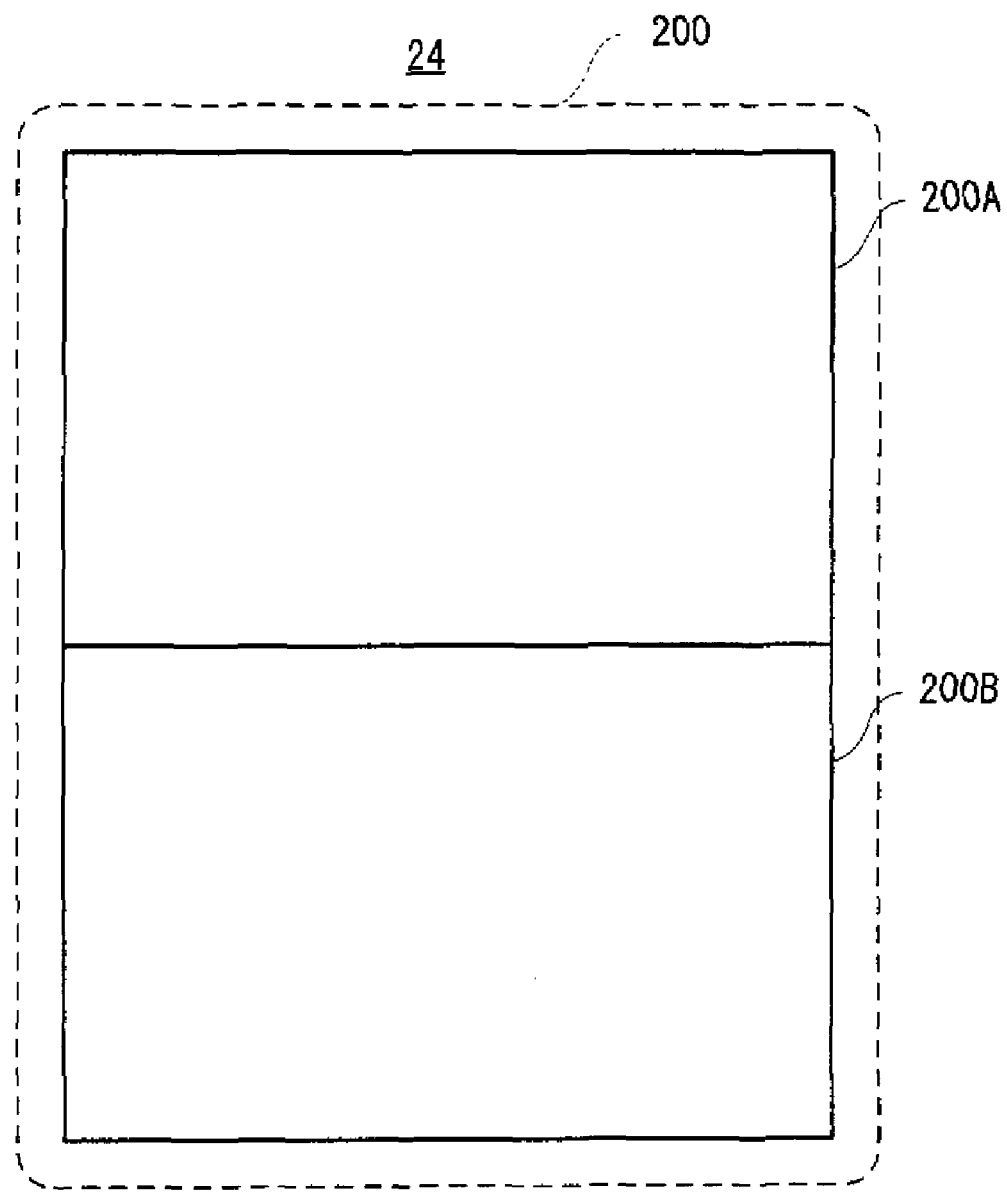
FIG. 8 is an illustrative view showing one example of a frame buffer applied to FIG. 1 embodiment.

FIG. 8 shows a frame buffer 200 being a part of the SDRAM 24, specifically, a frame buffer 200A and a frame buffer 200B. The frame buffer 200A stores image data corresponding to the thumbnail display screen 110A, and the frame buffer 200B stores image data corresponding to the thumbnail display screen 110B. By alternately applying the image data in the frame buffer 200A and the image data in the frame buffer 200B to the D/A converter 42 at a cycle of 0.5 seconds, the above-described displaying operation is realized.

Figure 6:
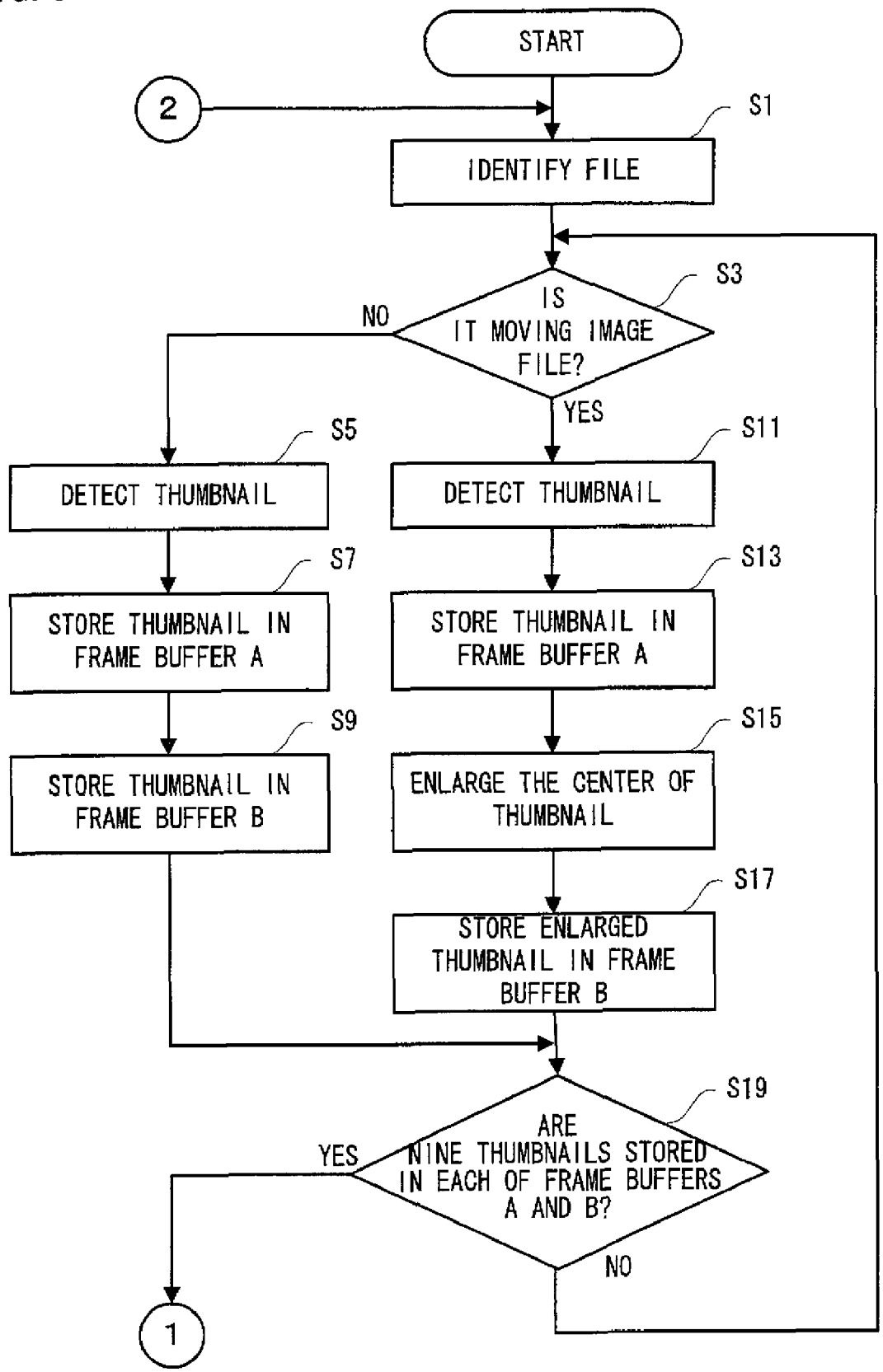
FIG. 6 is a flowchart showing a part of an operation of a CPU applied to FIG. 1 embodiment.
Figure 7:
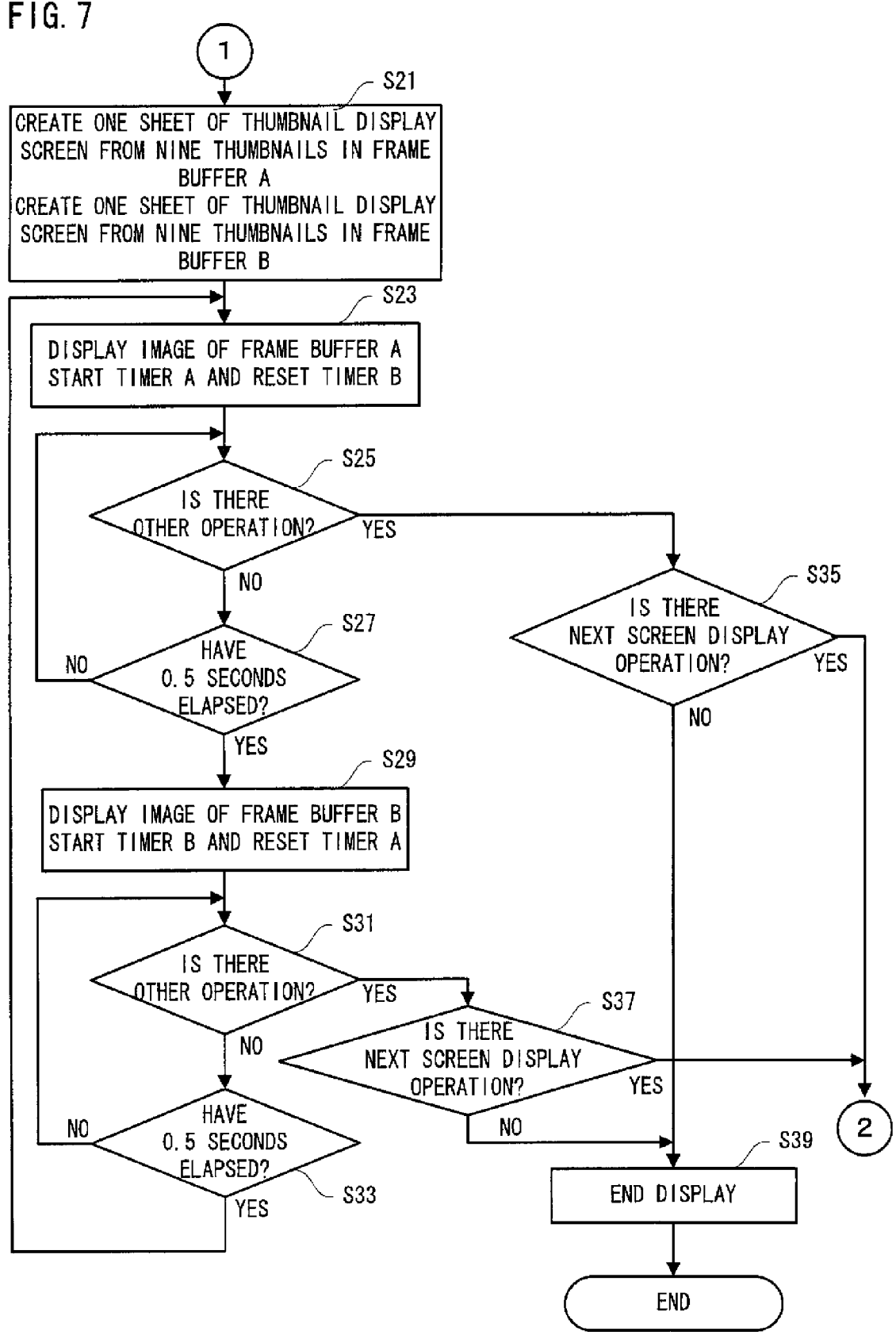
FIG. 7 is a flowchart showing another part of an operation of the CPU applied to FIG. 1 embodiment.

FIG. 6 and FIG. 7 show a flowchart showing display of nine thumbnails on the display 46. The description is made on a case that the still image file and the moving image file are stored in the external memory card 40, and the total number of files is equal to or more than nine. When the thumbnail display key 32G is operated, the CPU 26 executes a flowchart for displaying thumbnails shown in FIG. 6 and FIG. 7.

With reference to FIG. 6 and FIG. 7, in a step S1, nine files are selected from the external memory card 40 as files to be displayed as thumbnails, and the kind of each of the selected nine files is identified. In a step 3, it is determined whether or not any one of the identified nine files is a moving image file.

When it is determined that the file is a still image file, the process proceeds from the step S3 to a step S5 to detect a thumbnail of the still image file. Then, the process proceeds to a step S7, and in the step 7, the thumbnail detected in the step S5 is stored in the frame buffer 200A (see FIG. 8). In the frame buffer 200A, nine storing areas corresponding to thumbnails 300-316 in FIG. 3 are formed, and the thumbnail is stored in any one of them (storing area corresponding to the thumbnails 300, for example).

Then, the process proceeds to a step S9 to store a copy of the thumbnail in a frame buffer 200B. The frame buffer 200B is constructed similar to the frame buffer 200A, and the copied thumbnail is stored in the position the same as the original thumbnail. Thus, the thumbnail and its copy are displayed on the same position on the screen (the position of the thumbnail 300, for example). After storing, the process proceeds to a step S19.

In a case that a file to be displayed as a thumbnail is a moving image file, the process proceeds from the step S3 to a step S11 to detect a thumbnail of the moving image file. Then, the process proceeds to a step S13, and in the step 13, the thumbnail detected in the step S11 is stored in the frame buffer 200A. The thumbnail is stored at the same position as the thumbnail 302, for example. Then, the process proceeds to a step S15 to instruct the electronic zoom processing circuit 37 to enlarge the thumbnail detected in the step S11. The electronic zoom processing circuit 37 clips the center of the thumbnail, and enlarges the clipped center electronically. Thus, the enlarged thumbnail 102B shown in FIG. 5(B) is created from the thumbnail 102A shown in FIG. 5(A).

Then, the process proceeds to a step S17 to store the enlarged thumbnail in the frame buffer 200B. The enlarged thumbnail is stored at the same position as the thumbnail 302. Then, the process proceeds to a step S19.

In the step 19, it is determined whether or not nine thumbnails are stored in each of the frame buffers 200A and 200B. When it is determined that nine thumbnails are not stored, the process returns to the step S3 to perform the above-described processing. As to the storage position of the thumbnail, they preferably are stored in the positions of the thumbnails 300-316 in time sequence.

In the step S19, when it is determined that nine thumbnails are stored, the process proceeds from the step S19 to a step S21 to create a sheet of thumbnail display screen (thumbnail display screen 110A, for example) from the nine thumbnails stored in the frame buffer 200A, and create a sheet of the thumbnail display screen (thumbnail display screen 110B, for example) from the nine thumbnails stored in the frame buffer 200B. The two sheets of frame images thus created are respectively held in the frame buffers 200A and 200B.

Next, the process proceeds to a step S23, and in the step 23, the thumbnail display screen 110A held in the frame buffer 200A is displayed on the display 46, a timer 26A is started, and a timer 26B is reset. Next, the process proceeds to a step S25, and in the step 25, it is determined whether or not there is other operation. The other operation includes a pushing operation of the still image imaging mode key 32A, and an operation of displaying next nine thumbnails by the cursor key 32D.

In a case that it is determined that other operation is performed in the step S25, the process proceeds to a step S35, and in a case that other operation is not performed, the process proceeds to a step S27. In the step 27, it is determined whether or not 0.5 seconds have elapsed since the timer 26A started. If 0.5 seconds have not elapsed, the process returns to the step S25 to continue to display the thumbnail display screen 110A on the display 46 until it is determined that 0.5 seconds have elapsed.

In a case that it is determined that 0.5 seconds have elapsed from the start of the timer 26A in the step S27, the process proceeds to a step S29 to display the thumbnail display screen 110B held in the frame buffer 200B, start the timer 26B, and reset the timer 26A.

The process proceeds to a next step S31 to determine whether or not there is other operation similar to the step S25. In a case that it is determined there is other operation, the process proceeds to a step S37, and if it is determined there is no other operation, the process proceeds to a step S33. In the step 33, it is determined whether or not 0.5 seconds have elapsed from the start of the timer 26B, and in a case that 0.5 seconds have not elapsed, the process returns to the step S31 to continue to display the thumbnail display screen 110B on the display 46 until 0.5 seconds have elapsed. In a case that 0.5 seconds have elapsed from start of the timer 26B in the step S33, the process returns to the step S23 to perform the above-described processing.

In a case that it is determined there is other operation in the step S25, it is determined whether or not there is other next thumbnail displaying operation by the cursor key 32D in a step 35. In a case that it is determined that there is a next thumbnail display operation, the process returns to the step S1 from the step S35. If it is determined that there is no next thumbnail displaying operation, the process proceeds to a step S39 to end the display of the thumbnail display screen 110A.

In a case that it is determined that there is other operation in the step S31, it is determined whether or not there is a next thumbnail display operation. If it is determined that there is a next thumbnail display operation, the process returns from the step S37 to the step S1. In a case that it is determined that there is no next thumbnail display operation, the process proceeds to a step S39 to end the display of the thumbnail display screen 110B.

Thus, in the imaging device 10 according to this embodiment, still image files and moving image files are mixed in the external memory card 40. When a plurality of thumbnails respectively corresponding to the plurality of image files selected therefrom is displayed on the display 46, the CPU 26 determines whether or not each image file is a moving image file or a still image file (S3), and creates an enlarged thumbnails (102B) by clipping the center of the thumbnail (102A) corresponding to the moving image file, and enlarging it by the electronic zoom processing circuit 37. Then, a first screen (thumbnail display screen 110A) including a plurality of thumbnails and a second screen (thumbnail display screen 110B) including the enlarged thumbnail corresponding to the moving image file in the first screen are alternately displayed.

Thus, since only the thumbnail corresponding to the moving image file is periodically changed to the enlarged thumbnail (that is, the display magnification is periodically changed), it is possible to easily identify whether each of the plurality of image files is a moving image or a still image.

It should be noted that although identification may be possible without changing the thumbnail corresponding to the moving image file but by changing the thumbnail corresponding to the still image file, the change in this embodiment allows more intuitive identification because a thumbnail without motion indicates a still image file, and a thumbnail with motion indicates a moving image file.

Furthermore, since an enlarged thumbnail is generated from a sheet of thumbnail in the thumbnail display of the moving image file, a thumbnail with motion can be displayed without increasing a capacity of the thumbnail data.

It should be noted that although the thumbnails of the still image files and the thumbnails of the moving image files are simultaneously displayed in this embodiment (see FIG. 4(A) and FIG. 4(B)), both may be displayed at different timings.

Also, in this embodiment, the center of the thumbnail is enlarged (S15), but a part except for the center may be enlarged. Furthermore, the thumbnail is classified into an object and a background, and only the part of the object may be clipped and enlarged. In addition, the object thus enlarged is combined with the background, to thereby create an enlarged thumbnail with only the object enlarged.

Furthermore, in this embodiment, still image files and moving image files are mixed, and whether or not the kind of a file is a still image file or a moving image file (S3) is determined. However, in a case that still image files and moving image files are mixed, whether or not a still image file without sound and a still image file with sound may be identified. In this case, alternate display between a thumbnail and an enlarged thumbnail may be performed on any one of the still image file without sound and the still image file with sound, or may be preferably performed on the still image file with sound.

Furthermore, in this embodiment, still image files and moving image files are mixed in the external memory card 40, but sound files may be mixed without the kind of the file being restricted.

Additionally, in this embodiment, enlarged thumbnail is generated from the thumbnail of the moving image file, but a reduced thumbnail may be generated from the thumbnail.

In addition, in this embodiment, a thumbnail and an enlarged thumbnail are alternately displayed, but alternate display may be made between a thumbnail and a reduced thumbnail or a reduced thumbnail and an enlarged thumbnail.

Furthermore, in this embodiment, still image files and moving image files are stored in the external memory card 40, but may be stored in an internal memory.

In addition, in this embodiment, a description is made that the moving image file is a file of the MotionJPEG, but an MPEG file may be appropriated without being restricted thereto. In this case, any one of I pictures is selected as a thumbnail image for moving image.

Figure 9:
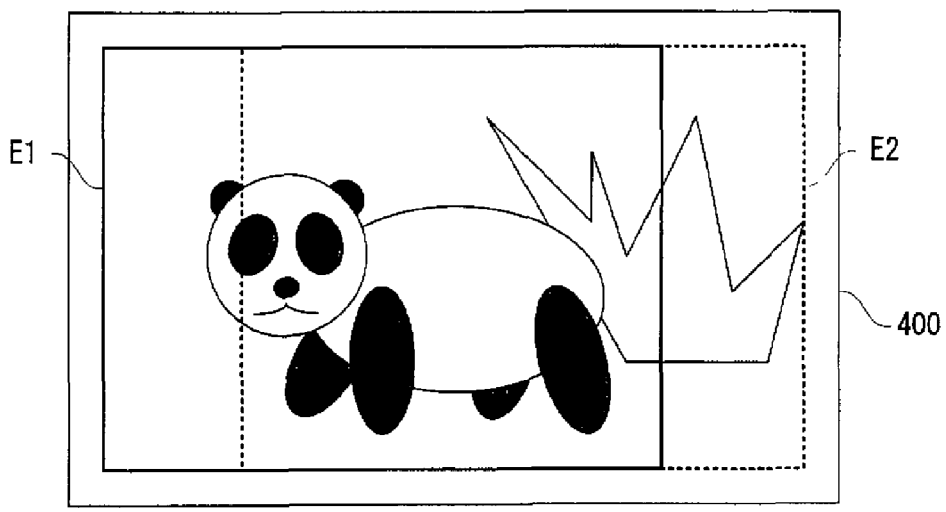
FIG. 9(A) is an illustrative view showing one example of an original image applied to another embodiment.
FIG. 9(B) is an illustrative view showing one example of a thumbnail display screen based on the original image in FIG. 9(A)
FIG. 9(C) is an illustrative view showing another example of a thumbnail display screen based on the original image in FIG. 9(A).
Figure 9:
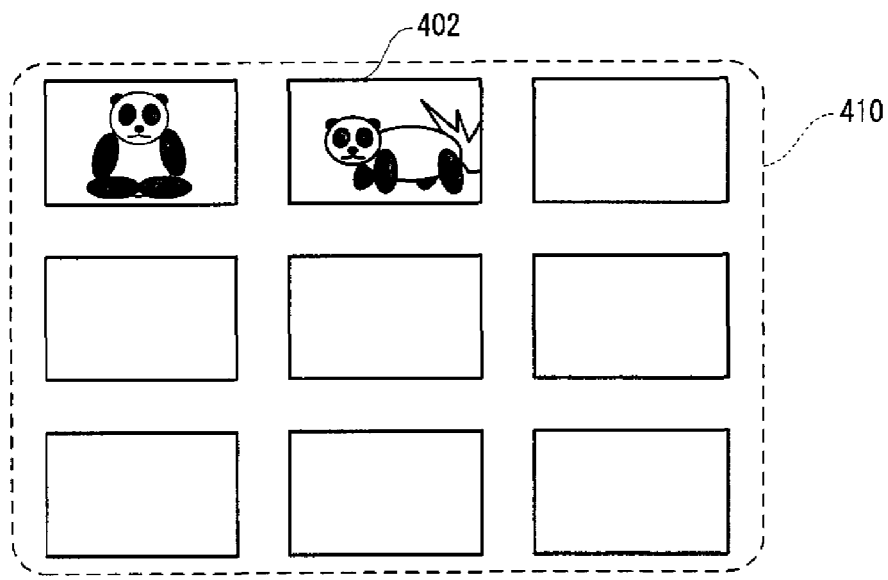
Figure 9:
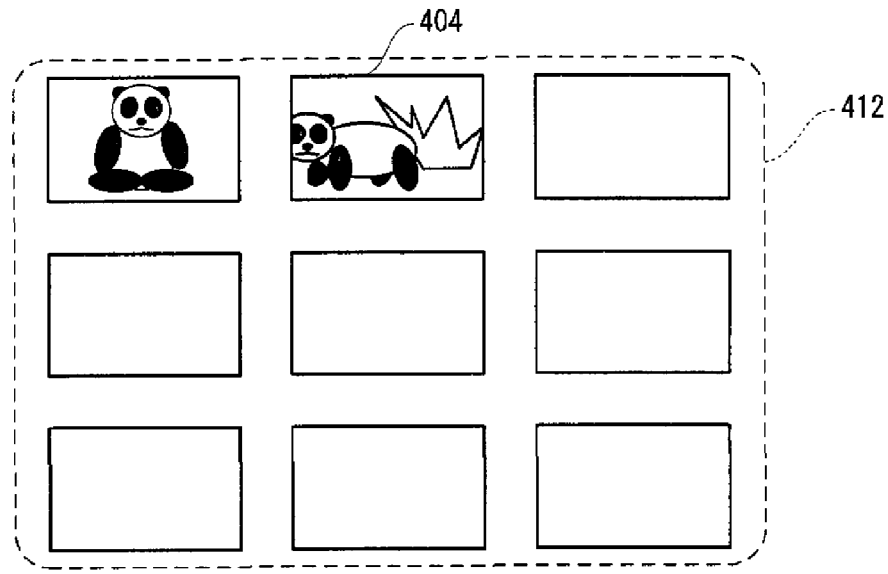

In the above description, a thumbnail and an enlarged thumbnail generated from the thumbnail are alternately displayed, but two thumbnails generated from a single original image may alternately be displayed. More specifically, with reference to FIG. 9(A)-FIG. 9(C), a thumbnail 402 obtained by noting an area E1 and a thumbnail 404 obtained by noting an area E2 are generated from the original image 400. Next, a thumbnail display screen 410 including the thumbnail 402 and a thumbnail display screen 412 including the thumbnails 404 are created, and the two created thumbnail display screens 410 and 412 are alternately displayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display unit capable of displaying a plurality of reduced images respectively corresponding to a plurality of original images, comprising:
   an identifier that identifies each kind of said plurality of original images;
   a processor that performs predetermined processing on a first reduced image corresponding to an original image in response to the original image being identified by said identifier as being a specific kind, and the predetermined processing generates a second reduced image; and
   a display that is controlled by said processor to alternately display a first screen including said first reduced image and a second screen including said second reduced image in place of said first reduced image on said first screen, wherein said first screen further includes a third reduced image corresponding to an original image whose identification result by said identifier indicates a kind except for said specific kind, and said second screen further includes a fourth reduced image the same as said third reduced image, wherein said processor automatically alternates the display of said first screen and the display of said second screen at a predetermined time interval.

2. A display unit according to claim 1, wherein said predetermined processing is processing of clipping a part of said first reduced image and enlarging it.

3. A display unit according to claim 2, wherein
   each of said plurality of original images is any one of a still image and a moving image, and
   said first reduced image corresponds to a moving image, and said third reduced image corresponds to a still image.

4. A display unit according to claim 1, wherein said second reduced image has a size equal to or almost equal to a size of said first reduced image.

5. A display method capable of displaying a plurality of reduced images respectively corresponding to a plurality of original images, comprising:
   an identifying step for identifying each kind of said plurality of original images;
   a processing step for performing predetermined processing on a first reduced image corresponding to an original image in response to the original image being identified by said identifying step as being a specific kind, and the predetermined processing generates a second reduced image; and
   a displaying step for alternately displaying a first screen including said first reduced image and a second screen including said second reduced image in place of said first reduced image on said first screen, wherein said first screen further includes a third reduced image corresponding to an original image whose identification result by said identifying step indicates a kind except for said specific kind, and said second screen further includes a fourth reduced image the same as said third reduced image, wherein said displaying step automatically alternates the display of said first screen and the display of said second screen at a predetermined time interval.

6. A display method according to claim 5, wherein said predetermined processing is processing of clipping a part of said first reduced image and enlarging it.

7. A display method according to claim 6, wherein
each of said plurality of original images is any one of a still image and a moving image, and
said first reduced image corresponds to a moving image, and said third reduced image corresponds to a still image.

8. A display method according to claim 5, wherein said second reduced image has a size equal to or almost equal to a size of said first reduced image.

9. A non-transitory computer-readable medium encoded with a display program for a display unit capable of displaying a plurality of reduced images respectively corresponding to a plurality of original images, said display program, when executed, causes a processor of said display unit to execute a method, comprising:
- an identifying step for identifying each kind of said plurality of original images;
- a processing step for performing predetermined processing on a first reduced image corresponding to an original image in response to the original image being identified by said identifying step as being a specific kind, and the predetermined processing generates a second reduced image; and
- a displaying step for alternately displaying a first screen including said first reduced image and a second screen including said second reduced image in place of said first reduced image on said first screen, wherein said first screen further includes a third reduced image corresponding to an original image whose identification result by said identifying step indicates a kind except for said specific kind, and said second screen further includes a fourth reduced image the same as said third reduced image, wherein said displaying step automatically alternates the display of said first screen and the display of said second screen at a predetermined time interval.

10. A non-transitory computer-readable medium according to claim 9, wherein said second reduced image has a size equal to or almost equal to a size of said first reduced image.

* * * * *